US010673372B2

(12) United States Patent
Azad et al.

(10) Patent No.: US 10,673,372 B2
(45) Date of Patent: Jun. 2, 2020

(54) COGNITIVELY PREDICTING DUST DEPOSITION ON SOLAR PHOTOVOLTAIC MODULES

(71) Applicant: International Business Machines Corporation, Armonk, NY (US)

(72) Inventors: Amar P. Azad, Bangalore (IN); Rashmi Mittal, New Delhi (IN); Vijay Arya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/836,175

(22) Filed: Dec. 8, 2017

(65) Prior Publication Data

US 2019/0181793 A1 Jun. 13, 2019

(51) Int. Cl.
| | | |
|---|---|---|
| *H02S 10/00* | (2014.01) | |
| *G01N 15/06* | (2006.01) | |
| *H02S 50/10* | (2014.01) | |
| *H02S 40/10* | (2014.01) | |
| *H02S 50/15* | (2014.01) | |
| *G01N 15/00* | (2006.01) | |

(52) U.S. Cl.
CPC ............. *H02S 10/00* (2013.01); *G01N 15/06* (2013.01); *H02S 40/10* (2014.12); *H02S 50/10* (2014.12); *H02S 50/15* (2014.12); *G01N 2015/0096* (2013.01); *G01N 2015/0693* (2013.01)

(58) Field of Classification Search
None
See application file for complete search history.

(56) References Cited

U.S. PATENT DOCUMENTS

| 7,999,173 B1 | 8/2011 | Ashpis |
| 2011/0066401 A1 | 3/2011 | Yang et al. |

(Continued)

FOREIGN PATENT DOCUMENTS

| JP | 2017034932 A | * 2/2017 | ............ H02S 40/10 |
| WO | 2016208969 A1 | 12/2016 | |

OTHER PUBLICATIONS

JP-2017034932-A, Machine Translation, Sakurazawa, Feb. 2, 2019 (Year: 2019).*

(Continued)

*Primary Examiner* — Devina Pillay
(74) *Attorney, Agent, or Firm* — Ryan, Mason & Lewis, LLP (57) ABSTRACT

Methods, systems, and computer program products for cognitively predicting dust deposition on solar photovoltaic modules are provided herein. A computer-implemented method includes deriving, with respect to solar photovoltaic modules, dust parameters from image data, and estimating, for a given future time at a current module orientation, an amount of surface area of the modules that will be covered by dust and a yield loss of the modules associated with dust coverage. The method also includes forecasting, for the given future time at each of one or more modified module orientations, an amount of surface area of the modules that will be covered by dust and a yield loss of the modules associated with dust coverage. Further, the method includes generating an instruction to change the orientation of at least one of the modules, and outputting the instruction to at least one actuation system associated with the modules.

19 Claims, 9 Drawing Sheets

(56) References Cited

U.S. PATENT DOCUMENTS

| | | | |
|---|---|---|---|
| 2012/0310427 A1 | 12/2012 | Williams et al. | |
| 2013/0048048 A1* | 2/2013 | Flanery | H02S 20/32 |
| | | | 136/246 |
| 2014/0209146 A1* | 7/2014 | Park | F24S 40/85 |
| | | | 136/246 |
| 2015/0094969 A1 | 4/2015 | Jungerman | |
| 2016/0104084 A1* | 4/2016 | Philip | G06Q 10/06311 |
| | | | 705/7.13 |
| 2016/0065123 A1 | 5/2016 | Hayes et al. | |

OTHER PUBLICATIONS

OpenEI, PV Watts Calculator, https://openei.org/wiki/PVWatts, 2017.

Joint Research Centre, Institute for Energy and Transport, Photovoltaic Geographical Information System (PVGIS), https://web.archive.org/web/20171204041707/http://re.jrc.ec.europa.eu/pvgis/, Dec. 4, 2017.

Jones et al., Optimized Cleaning Cost and Schedule Based on Observed Soiling Conditions for Photovoltaic Plants in Central Saudi Arabia, IEEE Journal of Photovoltaics, vol. 6, No. 3, May 2016.

Adinoyi et al., Effect of dust accumulation on the power outputs of solar photovoltaic modules, Renewable Energy, vol. 30, Dec. 2013.

Maghami et al., Mathematical Relationship Identification for Photovoltaic Systems under Dusty Condition, IEEE European Modelling Symposium 2015.

Lan et al., "Numerical Study of Sand Deposition and Control by Flat Solar Panels", Proceedings of the ASME 2012 International Mechanical Engineering Congress & Exposition IMECE2012 Nov. 9-15, 2012, Houston, Texas, USA.

Bitsuamlaka et al., "Evaluation of wind loads on solar panel modules using CFD", Proceedings of the Fifth International Symposium on Computational Wind Engineering (CWE2010) Chapel Hill, North Carolina, USA May 23-27, 2010.

Wang et al., "Modeling of Dust Deposition Affecting Transmittance of PV Modules", Journal of Clean Energy Technologies, vol. 5, No. 3, May 2017.

Sayyah et al., "Energy yield loss caused by dust deposition on photovoltaic panels", Journal of Solar Energy 107(2014) 576-604.

Elminir et al., "Effect of dust on the transparent cover of solar collectors" Journal of Energy Conyers. Manage, 47 (18), 3192-3203,2006.

Molki, A., Dust affects solar-cell efficiency. Phys. Edu. 45 (5), 456-458, 2010.

Sarver et al., "A comprehensive review of the impact of dust on the use of solar energy: History, investigations, results, literature, and mitigation approaches", Journal of Renewable and Sustainable Energy Reviews 22 (2013) 698-733.

Wang et al., "Implementation of dust emission and chemistry into the Community Multiscale Air Quality modeling system and initial application to an Asian dust storm episode",Joumal of Atmos. Chem. Phys., 12, 10209-10237, 2012.

Sulaiman et al.., "Effects of dust on the performance of PV panels". Proceedings of World Acad. Sci., Eng. Technol. 58, 588-593, 2011.

Nahar et al., "Effect of dust on transmittance of glazing materials for solar collectors under arid zone conditions of India", Journal of Solar Wind Technol. 7 (2), 237-243, 1990.

Kaldellis et al., "Quantifying the decrease of the photovoltaic panels' energy yield due to phenomena of natural air pollution disposal". Energy 35 (12), 4862-4869. 2010.

* cited by examiner

COGNITIVELY PREDICTING DUST DEPOSITION ON SOLAR PHOTOVOLTAIC MODULES

FIELD

The present application generally relates to information technology, and, more particularly, to photonic energy device management.

BACKGROUND

Dust is a common problem worldwide which impacts the yield and revenue generated by solar photovoltaic (PV) modules and solar farms. Dust deposition can degrade PV output in a nonlinear manner, and geographies with high solar potential are commonly arid and prone to increased amounts of dust. Also, various types of dust depositions can cause different levels of power degradations and minimize the intensity of the irradiance incident on a solar photovoltaic module.

SUMMARY

In one embodiment of the present invention, techniques for cognitively predicting dust deposition on solar photovoltaic modules are provided. An exemplary computer-implemented method can include deriving, with respect to one or more solar photovoltaic modules, multiple dust parameters from image data, and estimating, for a given future time at a current orientation of each of the one or more solar photovoltaic modules, (i) an amount of surface area of the one or more solar photovoltaic modules that will be covered by dust and (ii) a yield loss of the one or more solar photovoltaic modules associated with dust coverage, wherein said estimating is based on the multiple dust parameters and one or more items of input data. Such an embodiment also includes forecasting, for the given future time at each of one or more modified orientations for each of the one or more solar photovoltaic modules, (i) an amount of surface area of the one or more solar photovoltaic modules that will be covered by dust and (ii) a yield loss of the one or more solar photovoltaic modules associated with dust coverage, wherein said forecasting is based on the multiple dust parameters, the one or more items of input data, and one or more machine learning techniques. Further, such an embodiment includes generating an instruction to change the orientation of at least one of the one or more solar photovoltaic modules, prior to the given future time, based on said estimating and said forecasting, and outputting the instruction to at least one actuation system associated with the one or more solar photovoltaic modules.

In yet another embodiment of the invention, a system can include a solar photovoltaic module and one or more configurable reflective surfaces that (i) collect direct solar radiation and diffuse solar radiation and (ii) distribute the collected direct solar radiation and the collected diffuse solar radiation across one or more portions of the solar photovoltaic module. Also, in such an embodiment, each one of the plurality of configurable reflective surfaces is physically connected to the solar photovoltaic module at an angle that is variable in relation to the surface of the solar photovoltaic module, and at least one variable pertaining to each one of the plurality of configurable reflective surfaces is configurable, wherein the at least one variable relates to reflective surface orientation. Additionally, such an embodiment includes a controller, wherein said controller comprises at least a memory and a processor coupled to the memory, and wherein the controller modulates an amount of thermal output and/or electrical power output generated by the solar photovoltaic module, in response to at least one forecast pertaining to (i) an amount of surface area of the solar photovoltaic module that will be covered by dust at a given future time in connection with multiple configurations of the at least one variable and (ii) a yield loss of the one or more solar photovoltaic modules associated with dust coverage, by transmitting a signal to adjust the at least one variable in response to the at least one forecast.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes cognitively predicting dust deposition on solar photovoltaic modules (also referred to herein as solar arrays or solar panels). At least one embodiment of the invention includes collecting weather and solar farm data from Internet of Things (IoT) devices for cognitively predicting dust deposition on solar arrays, and accordingly changing orientations of individual and/or multiple solar arrays in the farm, to minimize dust deposition and maximizing power generation/yield. Such an embodiment can also include deriving panel dust parameters (such as dust type, dust thickness, interaction of panel dust with precipitation, etc.) from image data and estimating the panel area covered by dust. By way of example, one or more embodiments of the invention can include implementing hybrid physics-based and machine learning models, which take into account data such as surrounding soil parameters, forecasted wind speeds and precipitation, along with local and global dust transport models, to estimate dust deposition.

Further, at least one embodiment of the invention includes using machine learning techniques to forecast panel dust parameters and power/yield losses at different tilt angles and changing panel orientations (within a solar farm, for example) to minimize dust deposition and maximize yield/electricity generation.

As further detailed herein, factors impacting dust accumulation on panels can include environmental factors, dust-related factors, and location and installation factors. Environmental factors can include wind movement, wind direction, temperature, irradiation, air pollution, air pressure, dust storms, volcanoes, snow, humidity, etc. Dust-related factors can include dust type, such as soil and sand, clay, bacteria, carbon, etc. Additionally, location and installation factors can include, for example, sandy areas, industrial areas, glass material(s), orientation, height, tilt angle, flat or roughened surface, latitude and longitude, etc.

Figure 1:
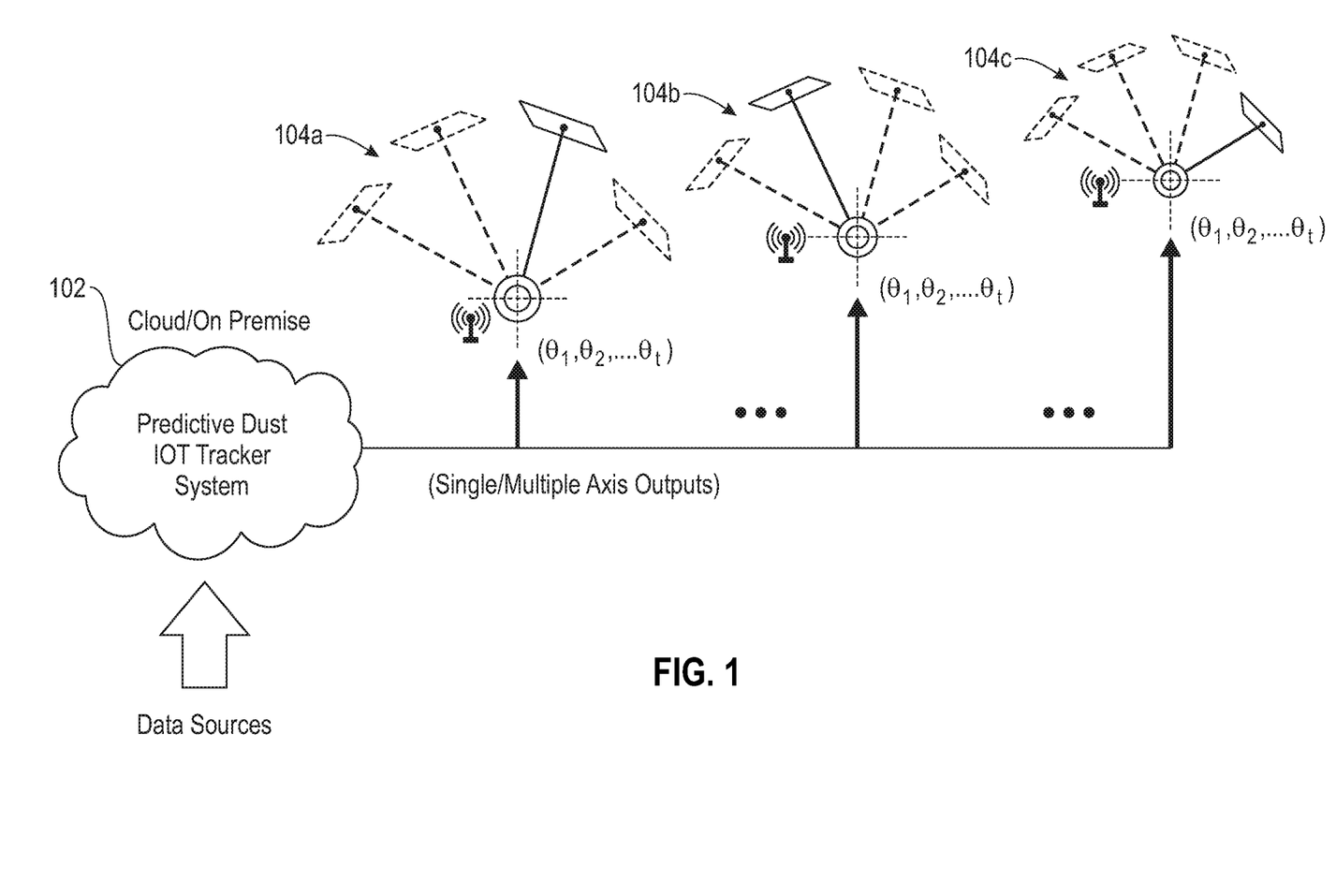
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a predictive dust IoT tracker system 102 (which can be located on premise or in the cloud) and actuator systems 104a, 104b, 104c (herein collectively referred to as actuator systems 104) associated with one or more respective solar photovoltaic modules. The prediction system 102 processes, from one or more data sources, input data such as, for example, ambient weather forecasts, ambient dust forecasts, location-specific data solar photovoltaic module (panel) data, historical panel image data, historical cleaning schedule data, and/or historical PV output data, and leverages machine learning and physics-based dust dispersion models to forecast dust deposition-based power losses at different panel tilt angles.

The actuator systems 104 take as input power loss forecasts at different panel orientations (provided by the prediction system 102) and provide recommendations to IoT trackers to jointly tilt one or more solar arrays optimally ahead of time to minimize dust deposition and maximize received irradiance. Such IoT trackers can include IoT-enabled systems (for example, with wired or wireless connectivity) connected with each solar panel's tracker that records, controls and/or maintains the orientations of each individual panel in a solar farm. The predictive IoT tracker system 102, in one or more embodiments of the invention, optimally orients the panels in a solar farm to jointly minimize dust deposition and maximize solar irradiance incident on the panel (that is, minimize power losses).

By way merely of illustration, consider the following example. Let the predicted panel dust parameters for the forecast horizon t=1, . . . , n be:

$D_{\theta_1,\theta_2}^t = \{\hat{d}_{1,\theta_1,\theta_2}^t, \ldots, \hat{d}_{k,\theta_1,\theta_2}^t\}$ t=1, . . . , n, wherein $\theta_1$ represents then tilt angle of a solar panel, wherein $\hat{d}_{k,\theta_1,\theta_2}^t$ represents dust deposition on the $k^{th}$ solar panel, and wherein $\theta_2$ represents the rotation/orientation of a solar panel, and wherein $D_{\theta_1,\theta_2}^t$ also depends on $D_{\theta_1,\theta_2}^{t-1}, \ldots, D_{\theta_1,\theta_2}^{t-h}$;

$\hat{I}_{\theta_1,\theta_2}^t$ t=1, . . . , n, which denotes the irradiance forecast at different panel orientations for the next n time steps;

$\hat{P}_{\theta_1,\theta_2}^t = f(\hat{D}_{\theta_1,\theta_2}^t, \hat{I}_{\theta_1,\theta_2}^t)$, which denotes the forecasted power losses at different panel orientations for the next n time steps, as output by the proposed system; and $$(\hat{\theta}_1, \hat{\theta}_2) = \min_{\theta_1,\theta_2} \sum_t \hat{P}_{\theta_1,\theta_2}^t,$$

which gives the optimal panel orientations for the next n time steps.

In one or more embodiments of the invention, model predictive control over successive moving windows of size n can be used to continually update panel orientations to benefit from the availability of more recent data. Additionally, multiple angles can be supported based on the cost of the mechanical equipment.

Further, in at least one embodiment of the invention, an actuation system can encompass and/or incorporate multiple trackers working together. For example, consider $$(\hat{\theta}_1^a, \hat{\theta}_2^a) = \operatorname*{argmin}_{\theta_1,\theta_2} \sum_{t, a \in A} \hat{P}_{\theta_1,\theta_2,a}^t,$$

which gives the optimal panel orientations for all arrays $a \in A$ in the solar farm for the next n time steps. That is, the tilt of each array is not independent, but depends on the tilts of the other arrays in the solar farm as well.

Also, in one or more embodiments of the invention, the orientations may differ for different sets of arrays such that trackers in the solar farm work jointly to minimize the overall dust deposition and maximize yield. For instance, arrays in an outer layer of the solar farm may implement a higher tilt, which can block portions of dust deposition for arrays within inner layers of the solar farm.

Additionally, if the predictive IoT tracker system 102 is deployed incrementally, then arrays with this feature can support one or more arrays without the tracker. Further, an optimization such as detailed herein is able to support such a feature because the prediction system 102 predicts losses in a solar farm by taking into account the farm layout and tilts in a computational fluid dynamics (CFD) model.

Also, in at least one embodiment of the invention, wake effects across panels are considered to jointly orient solar arrays so as to minimize the overall deposition of dust across the solar farm. A wake effect on solar panels can be determined, for example, via a modification in the incident wind speed and/or direction accordingly in the flux of dust. Such an effect can be incorporated via a CFD simulation, which can take the farm layouts and wind data as inputs, and compute the variation in the wind at each individual panel.

Figure 2:
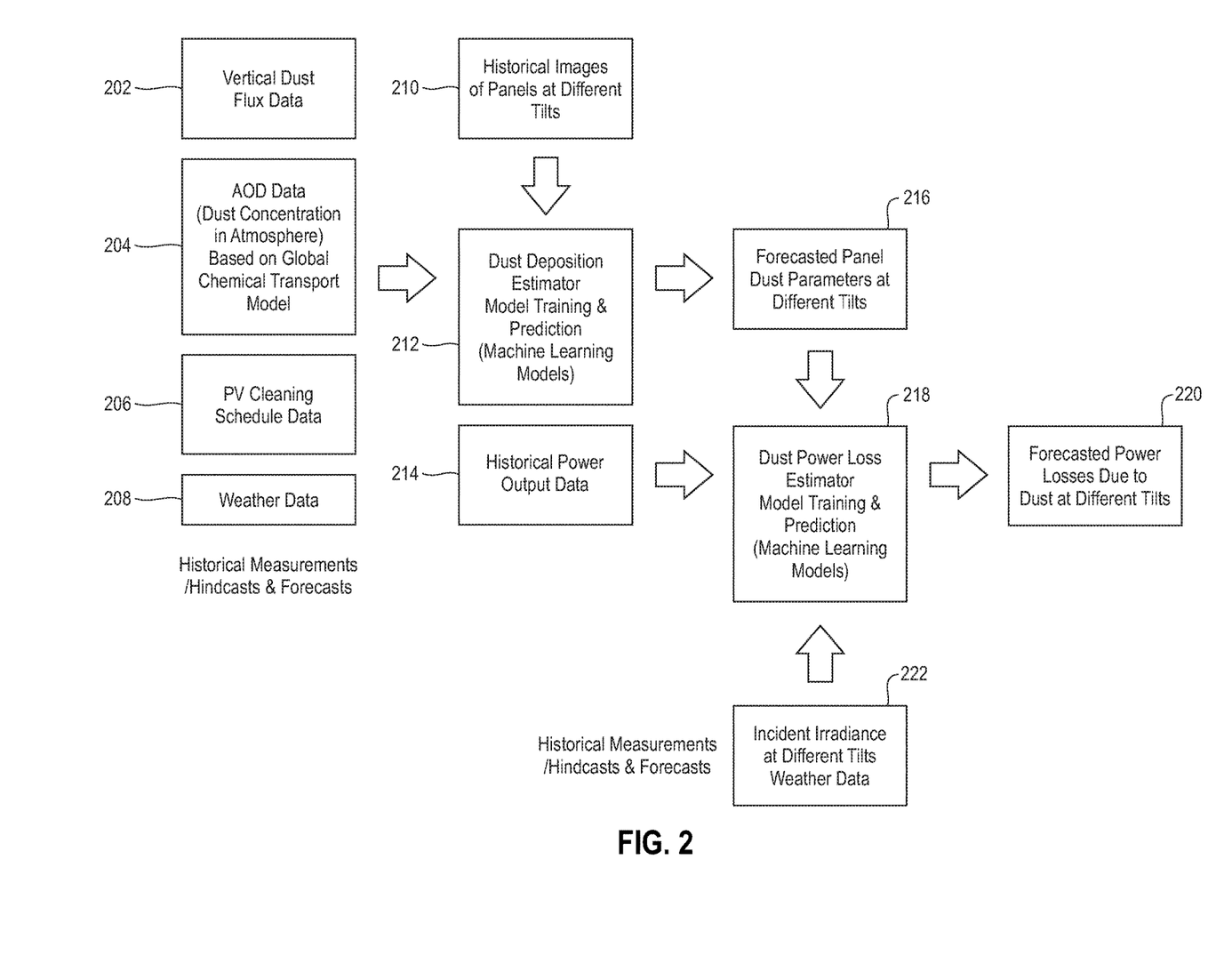
FIG. 2 is a diagram illustrating dust prediction components, according to an exemplary embodiment of the invention.

FIG. 2 is a diagram illustrating dust prediction components, according to an exemplary embodiment of the invention. By way of illustration, FIG. 2 depicts vertical dust flux data 202, aerosol optical depth (AOD) data 204 (representing dust concentration in the atmosphere, and based on a global chemical transport model), PV cleaning schedule data 206, and weather data 208. As used herein, vertical dust flux data (or, simply, vertical flux data) refer to the component of the dust that has reached the panel or within a close vicinity of the panel (such as, for example, the ground directly below the panel). With respect to AOD data 204, dust in the atmosphere can be transported worldwide by winds, covering vast distances. At least one embodiment of the invention includes utilizing AOD forecasts from a dust transport model to account for an impact of long-range atmospheric dust deposition on the panels in a solar farm. Also, with respect to the vertical dust flux data 202, at least one embodiment of the invention includes using location data, physics-based dust dispersion models, and a CFD model to compute the vertical dust flux density with respect to individual arrays in a solar farm.

As also illustrated, FIG. 2 additionally depicts historical image data 210 of the panels of the solar farm at different tilts, in conjunction with input data 202, 204, 206, and 208, provided to a dust deposition estimator 212, which carries out model training and prediction via one or more machine learning models. The outputs of the dust deposition estimator 212 can include one or more forecasted panel dust parameters (at different tilts) 216. Such parameters 216 can then be provided, in conjunction with historical power output data (associated with the solar farm) 214 and incident irradiance data at different tilts and related weather data 222, to a dust power loss estimator 218, which carries out model training and prediction via one or more machine learning models). The outputs of the dust power loss estimator 218 can include one or more forecasted power losses due to dust at different panel tilt orientations/configurations 220.

Figure 3:
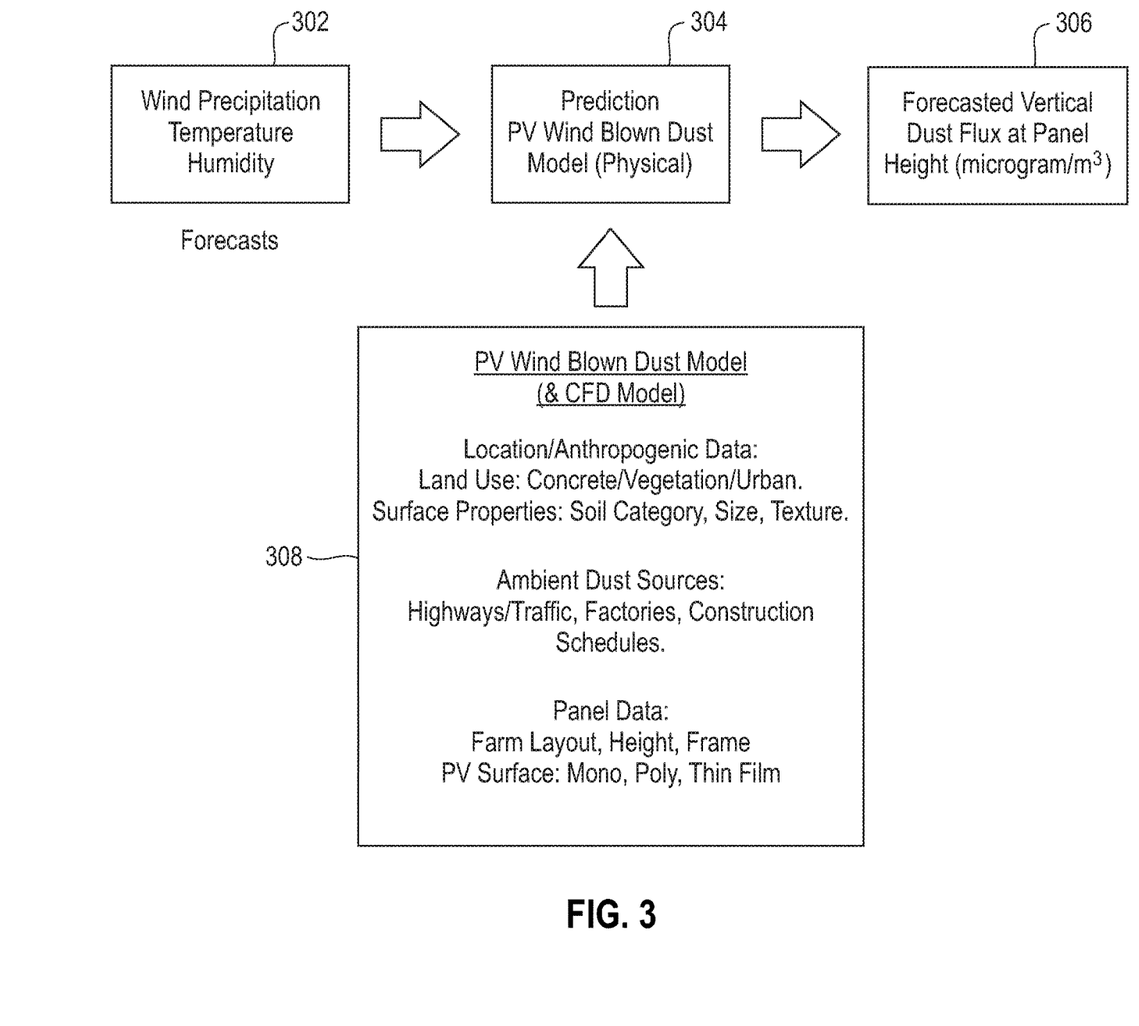
FIG. 3 is a diagram illustrating dust prediction components, according to an exemplary embodiment of the invention.

FIG. 3 is a diagram illustrating dust prediction components, according to an exemplary embodiment of the invention. By way of illustration, FIG. 3 depicts weather forecast data 302, which includes wind forecasts, precipitation forecasts, temperature forecasts, and humidity forecasts. Such weather data 302, in conjunction with a PV wind-blown dust model (and CFD model) 308, is provided to a prediction component 304, which implements the PV wind-blown dust model to generate an output. Such an output includes a forecasted vertical dust flux 306 at a given panel height (measured, for example, in micrograms per cubic meter). With respect to the PV wind-blown dust model 308, such a model can include location and/or anthropogenic data which include land use data, surface properties, etc. Such a model can also include ambient dust source information, and panel data (such as solar farm layout, height information, frame information, PV surface information, etc.).

In connection with FIG. 3, one or more embodiments of the invention can include implementing the following example equation: $F_d = E_F \times (1-R_F) \times C \times u_*^3 \times H$, wherein $F_d$ represents vertical dust flux, $E_F$ represents the fraction of erodible lands capable of emitting dust, $R_F$ represents the reduction factor for different types of lands (for example, 0.1 for barren land), C represents a parameter value corresponding to different soil types (for example, sandy soil, silt, clay soil, etc.), $u_*^3$ represents a surface frictional velocity based on wind speed and surface roughness, and H represents the Heaviside function based on a surface frictional velocity difference $(u_*-u_{*_t})$. Also, in one or more embodiments of the invention, if aerosol measurements are available in connection with the solar farm in question, then parameters of the physical models depicted in FIG. 3 can also be obtained via model training on historical data.

Figure 4:
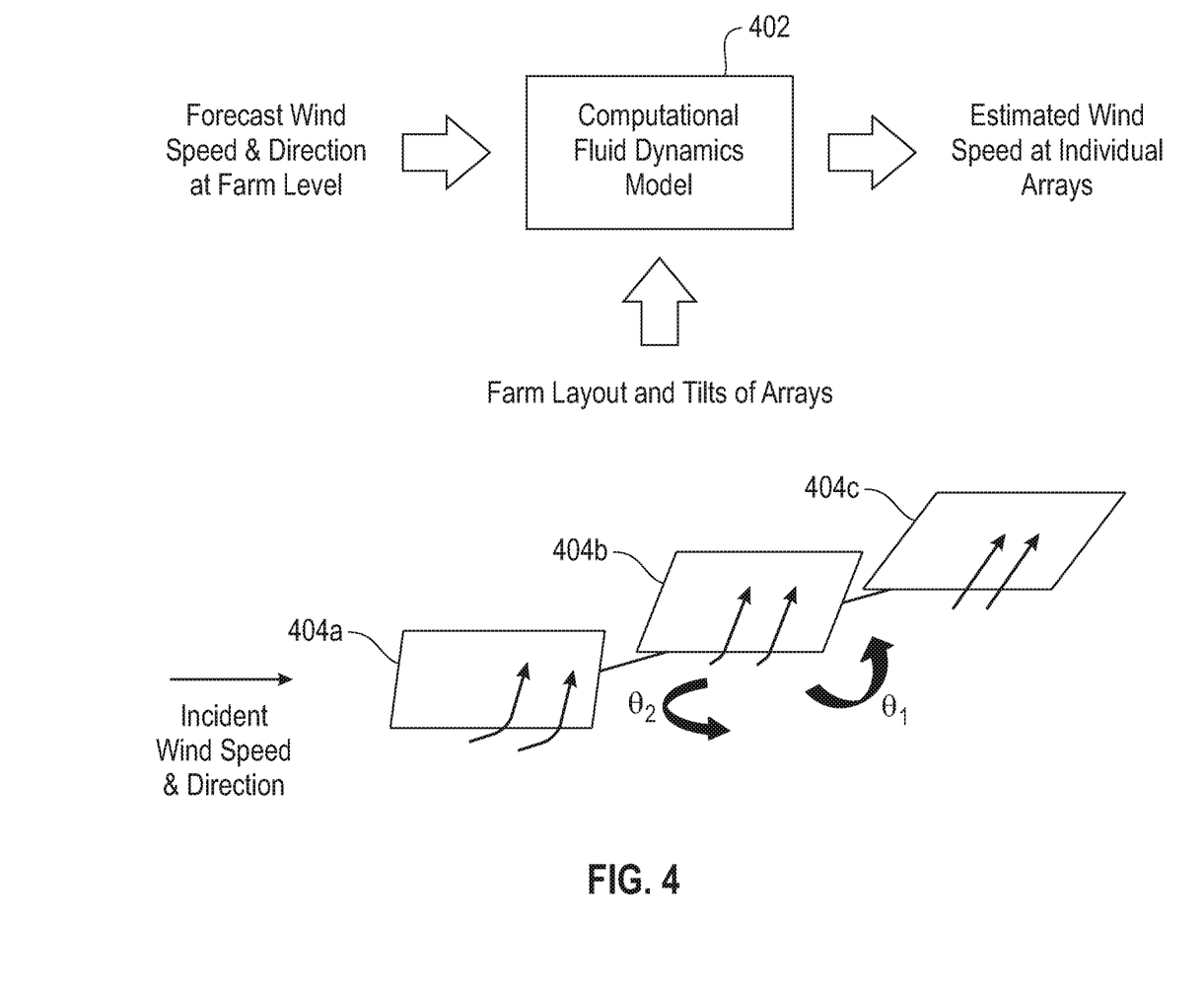
FIG. 4 is a diagram illustrating dust prediction components, according to an exemplary embodiment of the invention.

FIG. 4 is a diagram illustrating dust prediction components, according to an exemplary embodiment of the invention. By way of illustration, FIG. 4 depicts a CFD model 402, which receives, as input, forecasted wind speed and direction data at a solar farm level, and farm layout and array tilt information from arrays 404a, 404b, and 404c (collectively, 404). The CFD model 402, based on these inputs, outputs an estimated wind speed at each individual array (404).

Additionally, the wind speed and direction incident on individual arrays 404 in a solar farm can be a function of the joint layout of all arrays and their tilts based on the farm level winds. By modeling the farm layout and array tilts, the CFD model 402 can translate incident wind speed and direction into per array wind speed and direction. Based on these wind speeds and directions, the vertical dust flux is obtained on a per array/panel level in the solar farm (and one or more embodiments of the invention can include combining arrays into blocks to reduce computational complexity).

Figure 5:
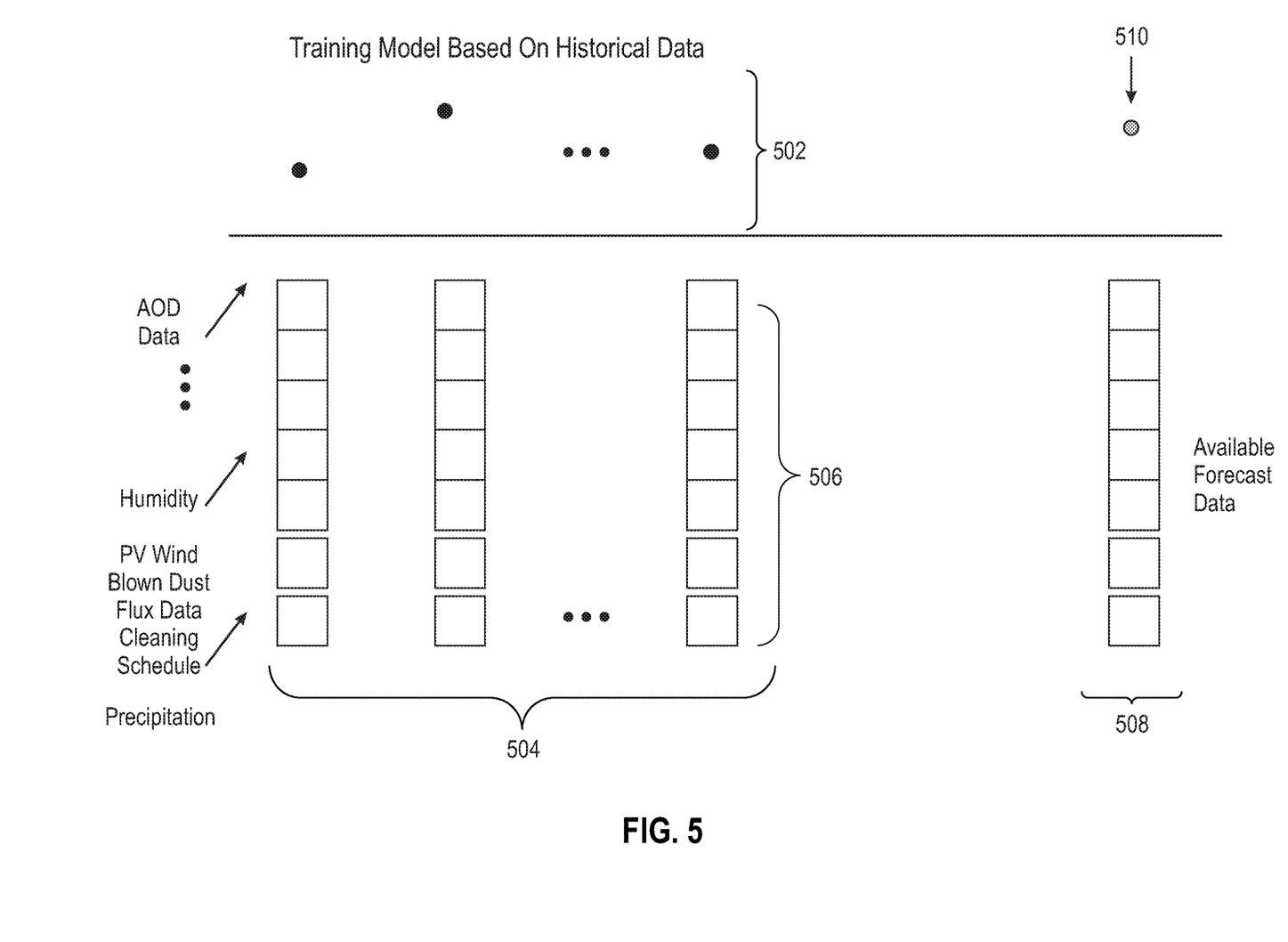
FIG. 5 is a diagram illustrating elements for forecasting solar photovoltaic module dust, according to an exemplary embodiment of the invention.

FIG. 5 is a diagram illustrating elements for forecasting solar photovoltaic module dust, according to an exemplary embodiment of the invention. By way of illustration, FIG. 5 depicts a training model based on historical data, which include historical panel dust parameters 502 derived from images, and a selected forecasted panel dust parameter 510. Additionally FIG. 5 depicts input data that include historical measurements and/or hindcast data 504 (such as, for example, AOD data, humidity data, wind-blown dust data, flux data, cleaning schedule data, precipitation data, etc.), which include one or more features 506, and a predicted horizon 508 based on available forecast data. Such features 506 can include, for example, the type of precipitations, a fixed additional pollution source from a neighboring factory, shading from trees at specific times of day, etc.

Figure 6:
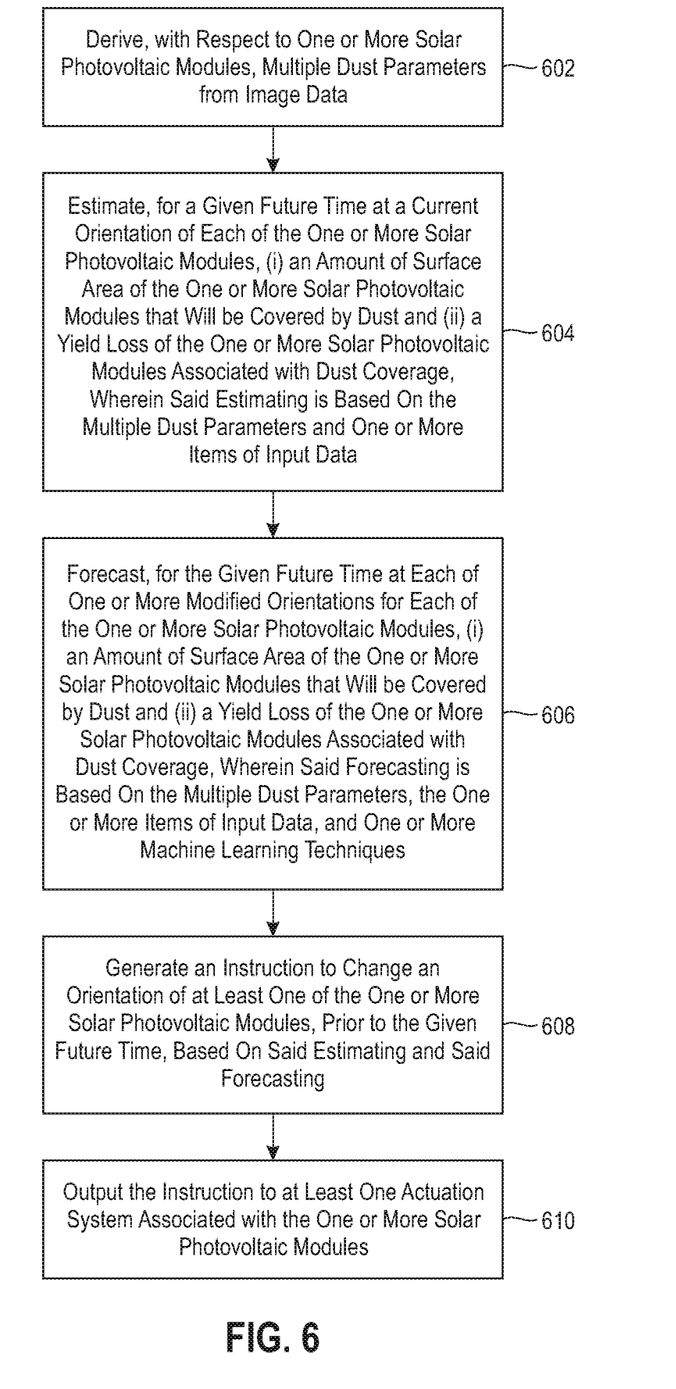
FIG. 6 is a flow diagram illustrating techniques according to an embodiment of the invention.

FIG. 6 is a flow diagram illustrating techniques according to an embodiment of the present invention. Step 602 includes deriving, with respect to one or more solar photovoltaic modules, multiple dust parameters from image data. The multiple dust parameters can include dust type, data pertaining to interactions between (i) dust on the one or more solar photovoltaic modules and (ii) precipitation, etc.

Step 604 includes estimating, for a given future time at a current orientation of each of the one or more solar photovoltaic modules, (i) an amount of surface area of the one or more solar photovoltaic modules that will be covered by dust and (ii) a yield loss of the one or more solar photovoltaic modules associated with dust coverage, wherein said estimating is based on the multiple dust parameters and one or more items of input data. The one or more items of input data can include input data from one or more Internet of Things devices, ambient weather forecast data, one or more surrounding soil parameters, forecasted wind speed data, precipitation data, ambient dust forecast data (including, for example, one or more local dust transport models and one or more global dust transport models), location data associated with the one or more solar photovoltaic modules (derived, for example, from asset and/or geographic information system (GIS) data, maps, municipal data, aerosol sensor data, etc.), cleaning schedule data associated with the one or more solar photovoltaic modules (derived, for example, from work order data), and/or historical output data associated with the one or more solar photovoltaic modules (derived, for example, from a supervisory control and data acquisition (SCADA) system).

Step 606 includes forecasting, for the given future time at each of one or more modified orientations for each of the one or more solar photovoltaic modules, (i) an amount of surface area of the one or more solar photovoltaic modules that will be covered by dust and (ii) a yield loss of the one or more solar photovoltaic modules associated with dust coverage, wherein said forecasting is based on the multiple dust parameters, the one or more items of input data, and one or more machine learning techniques. The one or more modified orientations can include a modified tilt angle of at least one of the one or more solar photovoltaic modules, and/or a modified rotation position of at least one of the one or more solar photovoltaic modules.

Step 608 includes generating an instruction to change the orientation of at least one of the one or more solar photovoltaic modules, prior to the given future time, based on said estimating and said forecasting. In at least one embodiment of the invention, the instruction reduces dust deposition on the one or more solar photovoltaic modules and increases received irradiance by the one or more solar photovoltaic modules. Step 610 includes outputting the instruction to at least one actuation system associated with the one or more solar photovoltaic modules.

The techniques depicted in FIG. 6 can also include limiting orientation modifications for at least one of the one or more solar photovoltaic module based on one or more temporally-based rules associated with the given future time.

Additionally, an additional embodiment of the invention includes a solar photovoltaic module and one or more configurable reflective surfaces that (i) collect direct solar radiation and diffuse solar radiation and (ii) distribute the collected direct solar radiation and the collected diffuse solar radiation across one or more portions of the solar photovoltaic module. Also, in such an embodiment, each one of the plurality of configurable reflective surfaces is physically connected to the solar photovoltaic module at an angle that is variable in relation to the surface of the solar photovoltaic module, and at least one variable pertaining to each one of the plurality of configurable reflective surfaces is configurable, wherein the at least one variable relates to reflective surface orientation. Additionally, such an embodiment includes a controller, wherein said controller comprises at least a memory and a processor coupled to the memory, and wherein the controller modulates an amount of thermal output and/or electrical power output generated by the solar photovoltaic module, in response to at least one forecast pertaining to (i) an amount of surface area of the solar photovoltaic module that will be covered by dust at a given future time in connection with multiple configurations of the at least one variable and (ii) a yield loss of the one or more solar photovoltaic modules associated with dust coverage, by transmitting a signal to adjust the at least one variable in response to the at least one forecast.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
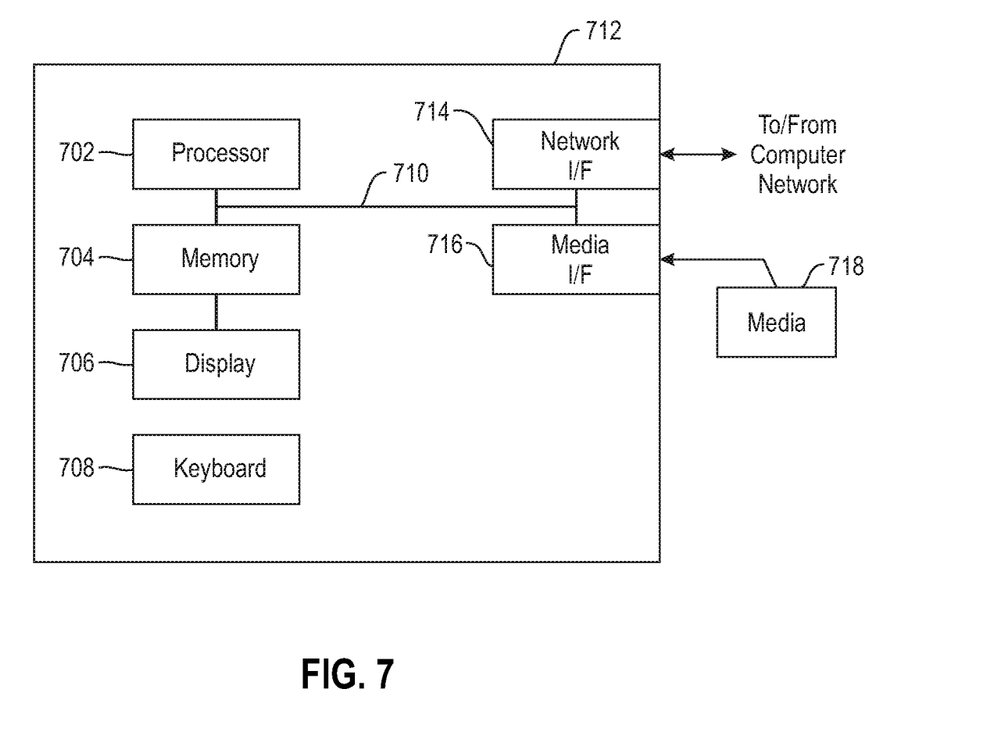
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
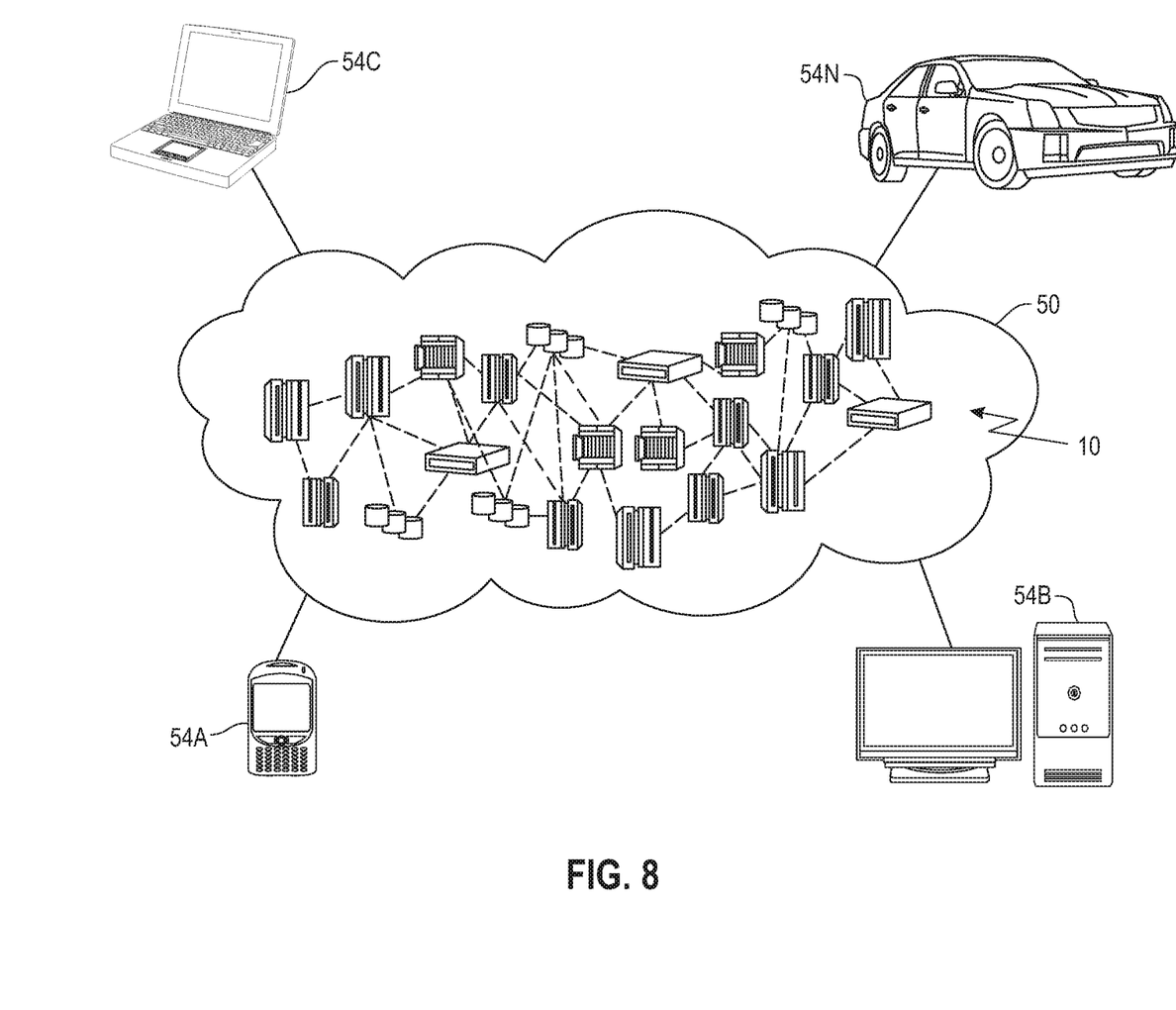
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
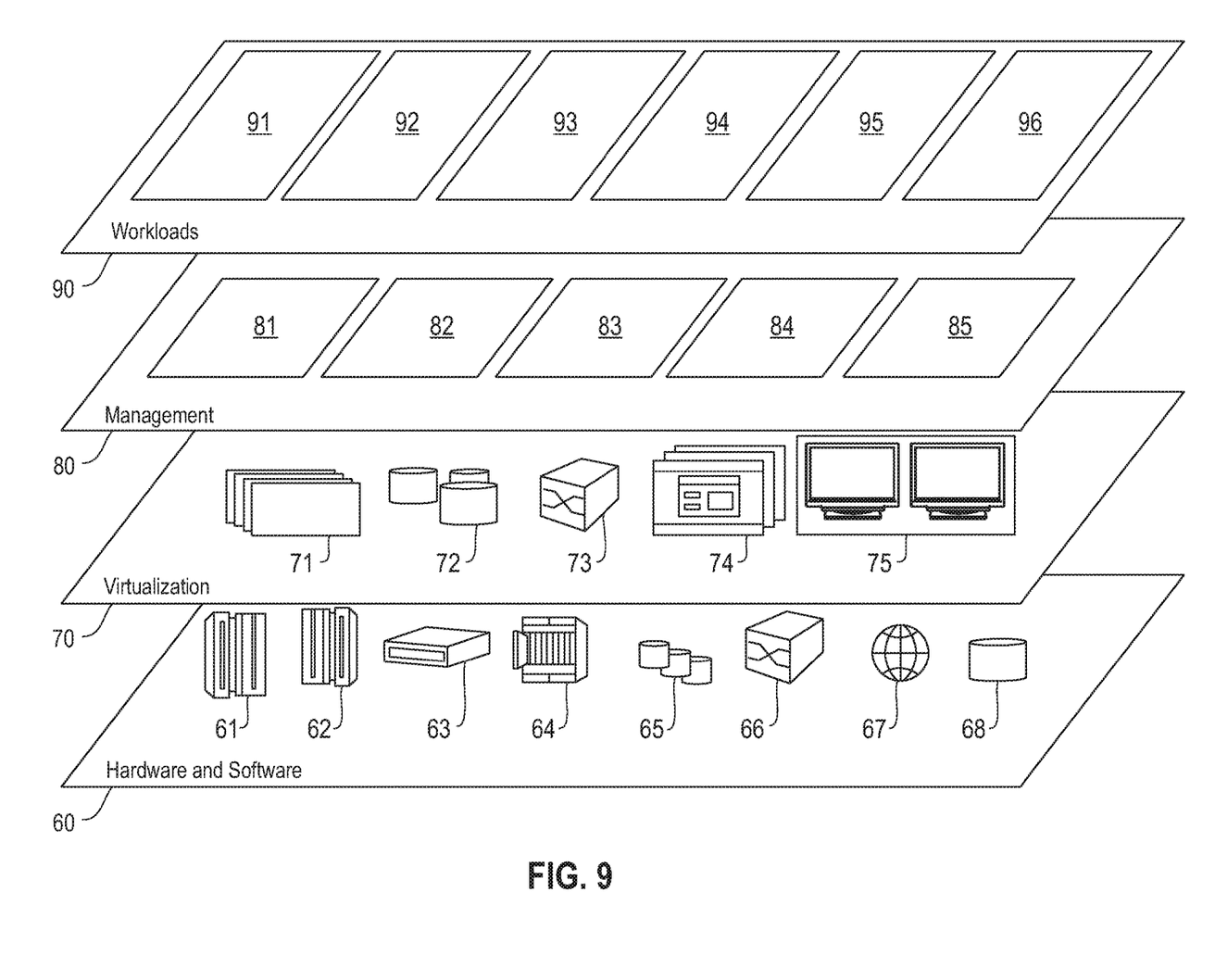
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive IoT solar photovoltaic module dust predicting 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining, using machine learning techniques, power losses of solar arrays at different tilt angles in connection with dust deposition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

deriving, with respect to one or more solar photovoltaic modules, multiple dust parameters from image data;

estimating, for a given future time at a current orientation of each of the one or more solar photovoltaic modules, (i) an amount of surface area of the one or more solar photovoltaic modules that will be covered by dust and (ii) a yield loss of the one or more solar photovoltaic modules associated with dust coverage, wherein said estimating is based on the multiple dust parameters and one or more items of input data;

forecasting, for the given future time at each of one or more orientations for each of the one or more solar photovoltaic modules, (i) an amount of surface area of the one or more solar photovoltaic modules that will be covered by dust and (ii) a yield loss of the one or more solar photovoltaic modules associated with dust coverage, wherein said forecasting is based on the multiple dust parameters, the one or more items of input data, and one or more machine learning techniques;

generating an instruction to change the orientation of at least one of the one or more solar photovoltaic modules, prior to the given future time, based on said estimating and said forecasting; and changing, via at least one actuation system associated with the one or more solar photovoltaic modules, the orientation of the at least solar photovoltaic module in accordance with the instruction;

wherein the method is carried out by at least one computing device.

2. The computer-implemented method of claim 1, wherein the multiple dust parameters comprise dust type and one or more additional dust parameters.

3. The computer-implemented method of claim 1, wherein the multiple dust parameters comprise data pertaining to interactions between (i) dust on the one or more solar photovoltaic modules and (ii) precipitation.

4. The computer-implemented method of claim 1, wherein the one or more items of input data comprise input data from one or more Internet of Things devices.

5. The computer-implemented method of claim 1, wherein the one or more items of input data comprise ambient weather forecast data.

6. The computer-implemented method of claim 1, wherein the one or more items of input data comprises one or more surrounding soil parameters.

7. The computer-implemented method of claim 1, wherein the one or more items of input data comprise forecasted wind speed data.

8. The computer-implemented method of claim 1, wherein the one or more items of input data comprise precipitation data.

9. The computer-implemented method of claim 1, wherein the one or more items of input data comprise ambient dust forecast data.

10. The computer-implemented method of claim 9, wherein the ambient dust forecast data comprise one or more local dust transport models and one or more global dust transport models.

11. The computer-implemented method of claim 1, wherein the one or more items of input data comprise location data associated with the one or more solar photovoltaic modules.

12. The computer-implemented method of claim 1, wherein the one or more items of input data comprise cleaning schedule data associated with the one or more solar photovoltaic modules.

13. The computer-implemented method of claim 1, wherein the one or more items of input data comprise historical output data associated with the one or more solar photovoltaic modules.

14. The computer-implemented method of claim 1, wherein the one or more orientations comprise one or more tilt angles of at least one of the one or more solar photovoltaic modules.

15. The computer-implemented method of claim 1, wherein the one or more orientations comprise one or more rotation positions of at least one of the one or more solar photovoltaic modules.

16. The computer-implemented method of claim 1, wherein the instruction reduces dust deposition on the one or more solar photovoltaic modules and increases received irradiance by the one or more solar photovoltaic modules.

17. The computer-implemented method of claim 1, comprising:
limiting orientations for at least one of the one or more solar photovoltaic module based on one or more temporally-based rules associated with the given future time.

18. A computer program product comprising a non-transitory computer readable storage medium having program instructions embodied therewith, the program instructions executable by a computing device to cause the computing device to:
derive, with respect to one or more solar photovoltaic modules, multiple dust parameters from image data;
estimate, for a given future time at a current orientation of each of the one or more solar photovoltaic modules, (i) an amount of surface area of the one or more solar photovoltaic modules that will be covered by dust and (ii) a yield loss of the one or more solar photovoltaic modules associated with dust coverage, wherein said estimating is based on the multiple dust parameters and one or more items of input data;
forecast, for the given future time at each of one or more orientations for each of the one or more solar photovoltaic modules, (i) an amount of surface area of the one or more solar photovoltaic modules that will be covered by dust and (ii) a yield loss of the one or more solar photovoltaic modules associated with dust coverage, wherein said forecasting is based on the multiple dust parameters, the one or more items of input data, and one or more machine learning techniques;
generate an instruction to change the orientation of at least one of the one or more solar photovoltaic modules, prior to the given future time, based on said estimating and said forecasting; and
change, via at least one actuation system associated with the one or more solar photovoltaic modules, the orientation of the at least solar photovoltaic module in accordance with the instruction.

19. A system comprising:
a memory; and
at least one processor operably coupled to the memory and configured for:
deriving, with respect to one or more solar photovoltaic modules, multiple dust parameters from image data;
estimating, for a given future time at a current orientation of each of the one or more solar photovoltaic modules, (i) an amount of surface area of the one or more solar photovoltaic modules that will be covered by dust and (ii) a yield loss of the one or more solar photovoltaic modules associated with dust coverage, wherein said estimating is based on the multiple dust parameters and one or more items of input data;
forecasting, for the given future time at each of one or more orientations for each of the one or more solar photovoltaic modules, (i) an amount of surface area of the one or more solar photovoltaic modules that will be covered by dust and (ii) a yield loss of the one or more solar photovoltaic modules associated with dust coverage, wherein said forecasting is based on the multiple dust parameters, the one or more items of input data, and one or more machine learning techniques;
generating an instruction to change the orientation of at least one of the one or more solar photovoltaic modules, prior to the given future time, based on said estimating and said forecasting; and
changing, via at least one actuation system associated with the one or more solar photovoltaic modules, the orientation of the at least solar photovoltaic module in accordance with the instruction.

* * * * *